Aug. 23, 1938.                F. H. McCORMICK                2,127,958
                                   PAIL
                            Filed May 25, 1937
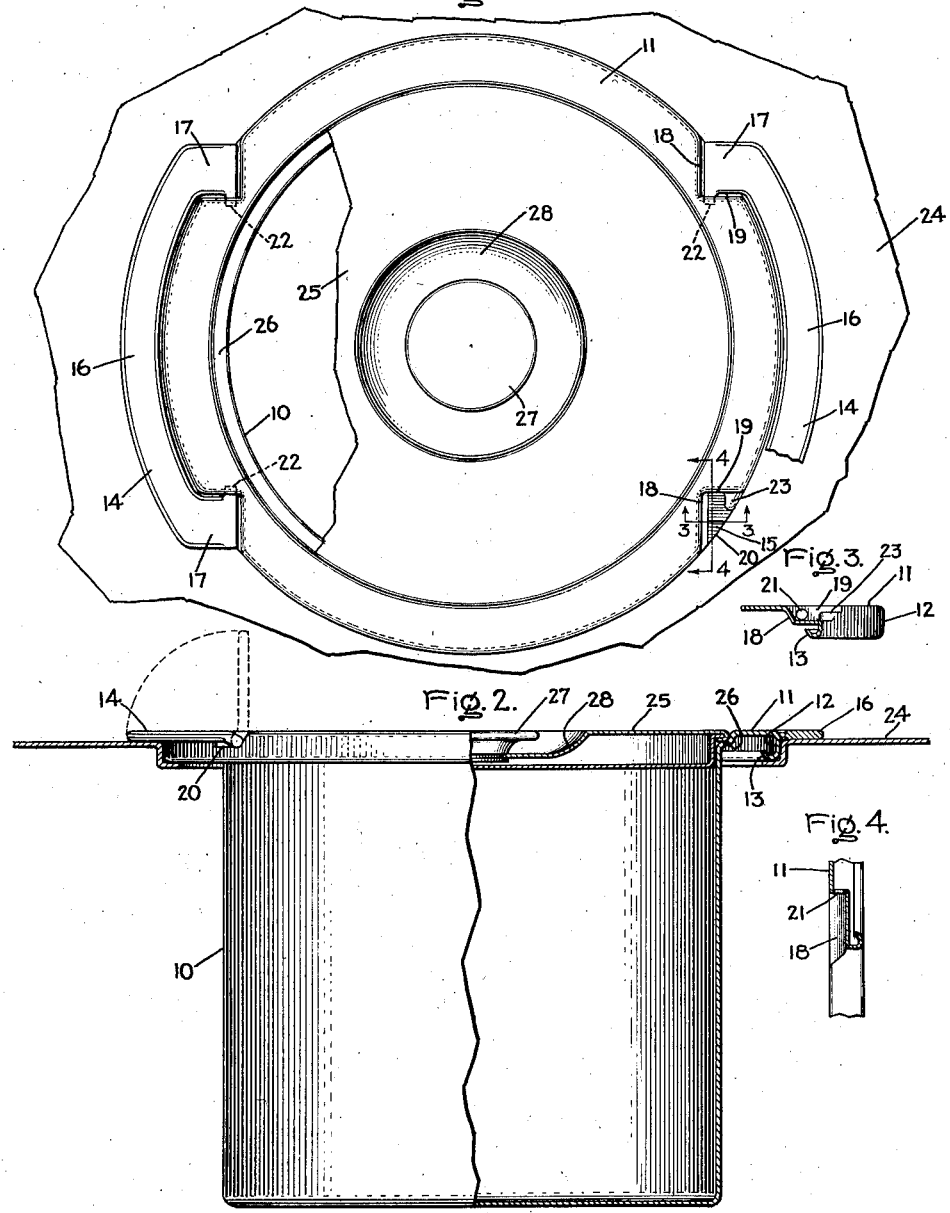
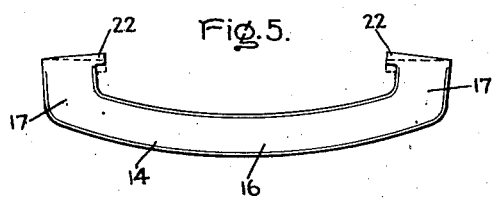
Inventor:
Francis H. McCormick,
by Harry E. Dunham
His Attorney.

Patented Aug. 23, 1938

2,127,958

UNITED STATES PATENT OFFICE 2,127,958

PAIL

Francis H. McCormick, Dayton, Ohio, assignor to Edison General Electric Appliance Company Incorporated, Chicago, Ill., a corporation of New York Application May 25, 1937, Serial No. 144,656

5 Claims. (Cl. 220—94)

This invention relates to pails, more particularly to cooker pails such as are used in electric ranges, and it has for its object the provision of an improved device of this character.

This invention is especially applicable to cooker pails for electric ranges wherein the pail is inserted into a cooking well through an aperture provided for it in the top surface of the range, and it contemplates an improved pail structure presenting a top substantially flush with the upper surface of the range, and also an improved handle structure in a cooker of this character.

For a more complete understanding of this invention, reference should be had to the accompanying drawing in which Fig. 1 is a plan view of a cooker pail embodying this invention, parts being broken so as to illustrate certain details of construction; Fig. 2 is an elevation of the cooker pail of Fig. 1, parts being broken away and parts shown in section so as to illustrate certain details of construction; Fig. 3 is an enlarged sectional view taken through the line 3—3 of Fig. 1 and looking in the direction of the arrows; Fig. 4 is an enlarged sectional view taken through the line 4—4 of Fig. 1 and looking in the direction of the arrows; and Fig. 5 is a plan view of a handle used with the pail of Figs. 1 to 4, showing the handle in its condition preparatory to assembly with the pail.

Referring to the drawing, this invention has been shown in one form as applied to a cooking pail intended to be inserted into an aperture provided for it in the cooking surface of an electric range. This pail, as shown, comprises walls defining a deep cylindrical receptacle 10 adapted to receive the edibles to be cooked. The receptacle need not be cylindrical, but may have any other suitable shape.

At its top the receptacle is provided with an outwardly extending substantially horizontal circular flange 11, preferably formed integrally with the receptacle. The outer edge of the flange 11 merges into a depending vertical flange 12, and the lower end portion 13 of this flange is folded inwardly upon the flange, as shown.

Arranged on opposite sides of the cooker and pivotally secured to the flange 11 are a pair of handles 14 normally lying in a substantially horizontal position. For the purpose of pivotally receiving the handles, the flange is provided with pairs of oppositely positioned associated seats or depressions 15 for the handles. Each handle has a relatively elongated flat central section 16 whose side edges are substantially parallel and formed on the arc of a circle concentric with the flanges 11 and 12 and with the walls of the cylindrical container 10. The central section 16 terminates in hinge end sections 17 lying substantially in the plane of the central section, and which are turned inwardly from the central section, as shown.

These end sections are received in the seats 15 provided in the flange 11. The pairs of seats 15 for each handle are spaced apart and shaped so as to receive the end portions 17 of the handles, as clearly shown in Fig. 1.

The seats 15 preferably will be formed of the metal of which the flange 11 is made and also preferably will be formed by mechanical operations depressing the metal at the proper locations and through the proper areas to give seats of the correct shape. With handle end sections 17 of the shape shown, the seats will have roughly the shape of a triangle. The two sides of the triangular seats are formed by the walls 18 and 19 formed of the material of the flange 11 when it is depressed, while the other leg is formed by the opening 20 in the outer flange 12. The walls 19, as shown, are parallel to each other and to the edges of the end sections 17. These walls are provided with apertures 21 which are arranged to receive lugs 22 arranged on the inner ends of the handle end sections 17 and directed toward each other, as shown in Fig. 1. The lugs preferably will be formed integrally with the end sections.

Preferably, the central and end sections 16 and 17 and the pins 22 will be stamped from a suitable piece of metal by suitable mechanical stamping machines, or the like. The handle preparatory to assembly with the pail will be formed in the shape shown in the full lines in Fig. 5 with the two end sections 17 flaring or spreading outwardly from each other, as shown. The handle will then be moved into its operative position in its associated seats 15, and then the two end sections 17 will be forced toward each other to assume the positions they have in dotted lines in Fig. 5. This operation forces the pins into the oppositely positioned apertures 21 provided in the seat structure and thereby secures the handle to the pail.

The seats are so proportioned relative to the handle, and the apertures in the seats are so located that when the handles are assembled as previously described, the central sections 16 will lie outside of the flange 12 and concentric with the flanges 11 and 12 and with the walls of the pail 10. Moreover, the apertures 21 are so located with relation to the top surface of the flange 11 that the top surfaces of the handles 14 can be moved into the plane of the flange, as clearly shown in Fig. 2. Preferably and as shown in (Fig. 2), the ends of the sections 17 that carry the pins 22 are turned downward slightly from the plane of the section. When the ends are turned down in this fashion, the seats are provided with abutments 23 in the openings 20 at the outer ends of the walls 19 arranged to engage the handles so as to support them with their upper surfaces flush with the flange 11, as shown in Fig. 2. The abutments 23 also will be formed of the material of which the flanges are made and also by the previously referred to mechanical operations.

When it is desired to elevate the pail or carry it, the handles are moved to their dotted line positions shown in Fig. 2 so that the central sections 16 can be conveniently grasped by the attendant. The handles cannot be moved beyond this position because the inclined surfaces formed by the down-turned end sections 17 engage the walls 18 which also preferably will be and as shown are given a corresponding inclined form.

As previously described, this invention is particularly applicable to cooker pails for electric ranges which are inserted through apertures provided for them in the top surface of an electric range. The top surface of the electric range is indicated by the numeral 24 in Figs. 1 and 2, and as shown, the top surfaces of the flange 11 and handles 14 lie substantially in the plane of the top of the range.

The cooker is also provided with a cover 25 which is supported in a seat 26 formed at the upper end of the pail where it merges into the horizontal flange 11. The cover is provided with a handle or knob 27, which as shown seats in a recess 28 in the top of the cover so that the top of this knob will also lie substantially in the plane of the upper surfaces of the flange 11, the handles 14 and the cooking top 24.

While I have shown a particular embodiment of my invention, it will be understood, of course, that I do not wish to be limited thereto since many modification may be made, and I, therefore, contemplate by the appended claims to cover any such modifications as fall within the true spirit and scope of my invention.

What I claim as new and desire to secure by Letters Patent of the United States, is:

1. A cooker pail and the like comprising a cylindrical receptacle for receiving edibles and the like having a substantially vertical wall, a circular substantially horizontal flange extending outwardly from the upper end of said vertical wall, a pair of oppositely positioned hinges having flat hand grasping portions outside of and substantially concentric to the outer edge of said flange, each handle having hinge parts extending inwardly from the grasping portion, and the upper surface of said flange being provided with recessed seats receiving said hinge parts, the seats being provided with apertures, and the hinge parts having pins received in said apertures to pivotally secure the handle to the pail, the seats having such depth and the apertures being so positioned in them that the hinges can be moved to substantially horizontal positions with their upper surfaces substantially flush with the upper surface of the flange, and the seats being provided with stop means engaging the handle to determine said positions.

2. A cooker pail and the like comprising a receptacle having at its upper end an outwardly extending substantially horizontal circular flange, the outer edge of the flange terminating in a downwardly extending circular vertical flange, the top flange having two pairs of spaced seats on opposite sides of the cooker, the seats opening out through the vertical flange, a pair of handles positioned on opposite sides of said cooker, each handle having a flat hand grasping portion outside of said vertical flange and substantially concentric with it, and also having hinge portions extending inwardly through the openings in the vertical flange to be received in said seats, each of the seats of each pair having a vertically arranged wall substantially parallel to that of the other seat of the pair, in which walls apertures are provided, and the hinge portions having hinge pins received in said apertures to pivotally secure the handle to the pail so that in one position of the handle, the upper surface thereof is substantially flush with the upper surface of the horizontal flange, a cover for the pail, and seat for said cover arranged substantially at the junction of the pail with the horizontal flange and positioning the cover so that its upper surface lies substantially flush with the surfaces of the horizontal flange and handles when the cover is in its closed position.

3. A cooker pail and the like comprising a receptacle, a flange extending substantially horizontally from said receptacle, a handle having a hand grasping portion substantially parallel with the outer edge of the flange, and its top surface substantially flush with the top surface of said flange, and the handle having hinge arms in the plane of and extending inwardly from the grasping portion, the flange having seats recessed in its top surface receiving said hinge arms, the inner extremities of the arms being turned downwardly at an angle to the plane of the handle and at their lower ends supporting hinge pins, and the seats having apertures receiving said pins so that the handle can be elevated from its position in the seats, and the seats also having upraised abutments on which said handle rests when in its position in said seats.

4. A cooker pail and the like comprising a receptacle for receiving edibles and the like, a substantially flat horizontal flange extending outwardly from said receptacle having depressions in its wall defining a pair of spaced seats below the upper surface of the flange, and the walls of the seats being formed of the material of said flange, a handle for the pail having a hand grasping portion, and hinge portions extending into said seats from the grasping portion and hinged to the walls of said seats and engaging the walls to hold the grasping portion in a substantially horizontal position with its top substantially flush with the top of said horizontal flange, the grasping portion being pivotally movable from said horizontal position to a substantially vertical position whereby it can be used to support the pail.

5. A cooker pail and the like comprising a receptacle for receiving edibles provided with a flange extending outwardly from the upper edge thereof and having a substantially flat upper surface, oppositely positioned handles for said pail having flat hand grasping portions outside of the flange and relatively close to it, the handles also having hinge parts at the ends of the hand grasping portions extending inwardly and the flange having spaced seats below its upper space receiving said hinge parts, means pivotally connecting said hinge parts to the walls of the seats, and the seats supporting the hinge parts to hold the handles with the upper surfaces of the hand grasping portions substantially in the plane of the upper surface of the flange, and the pivotal connecting means providing for pivotal movement of the hand grasping portions to substantially vertical positions.

FRANCIS H. McCORMICK.